Feb. 26, 1957 H. A. LISHERNESS 2,782,816
SLOTTING APPARATUS FOR CLOTHESPIN MACHINES
Original Filed Jan. 14, 1949 4 Sheets-Sheet 1

Inventor
Hillman A. Lisherness
By Kenway, Jenney, Witter & Hildreth
Attorneys

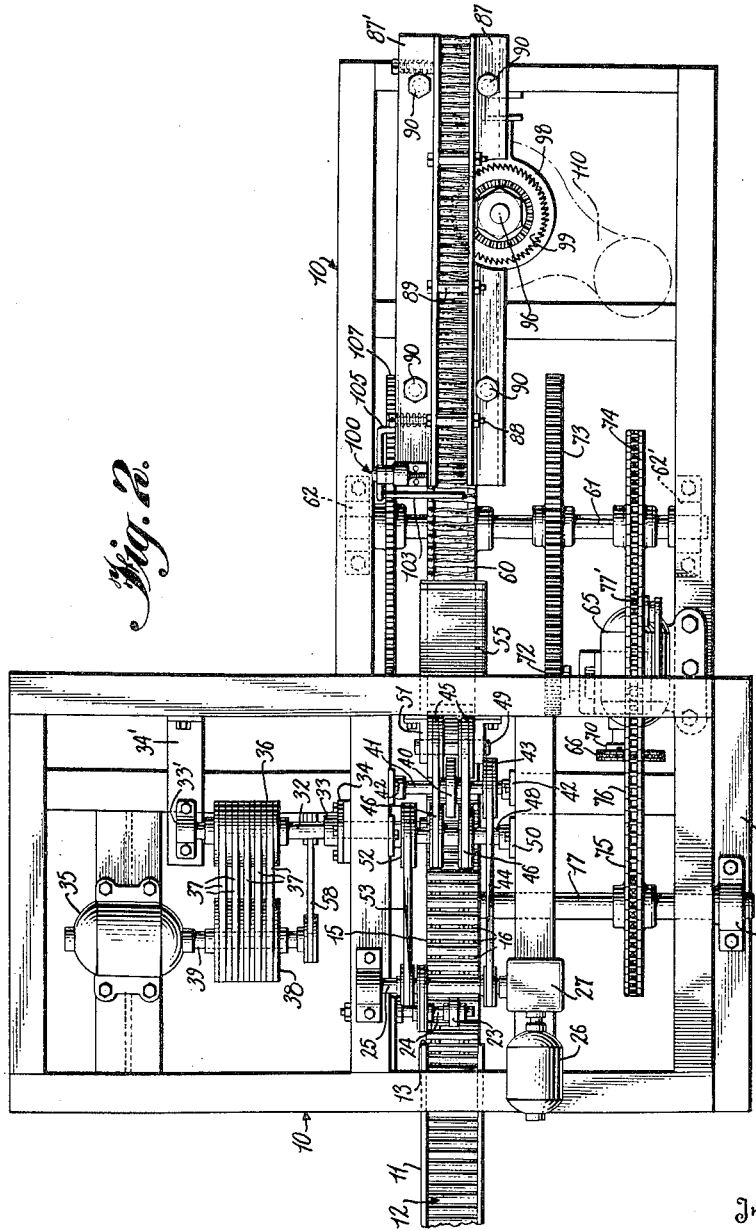

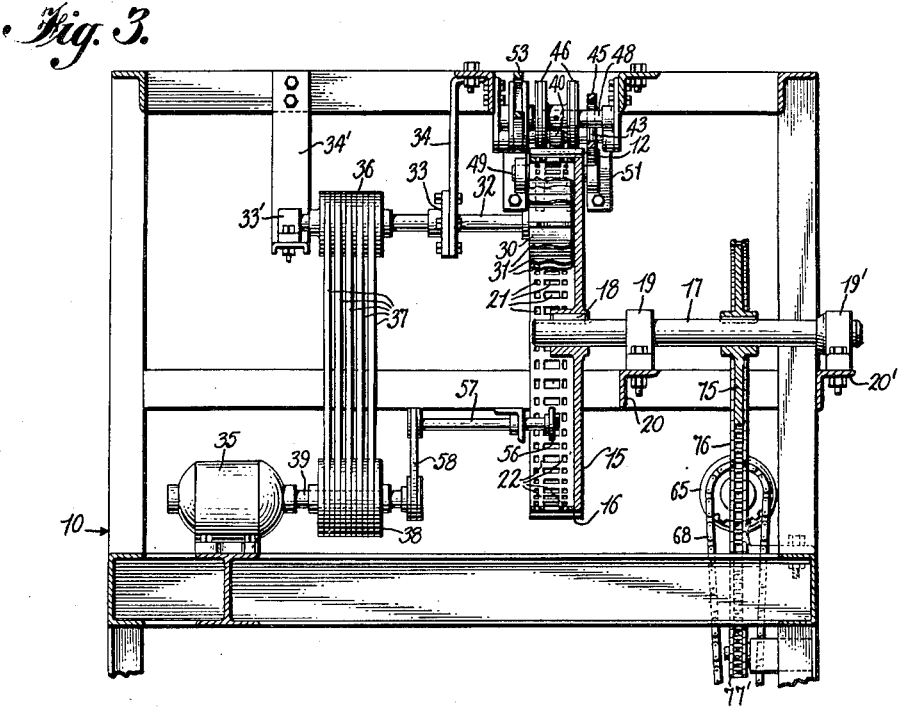

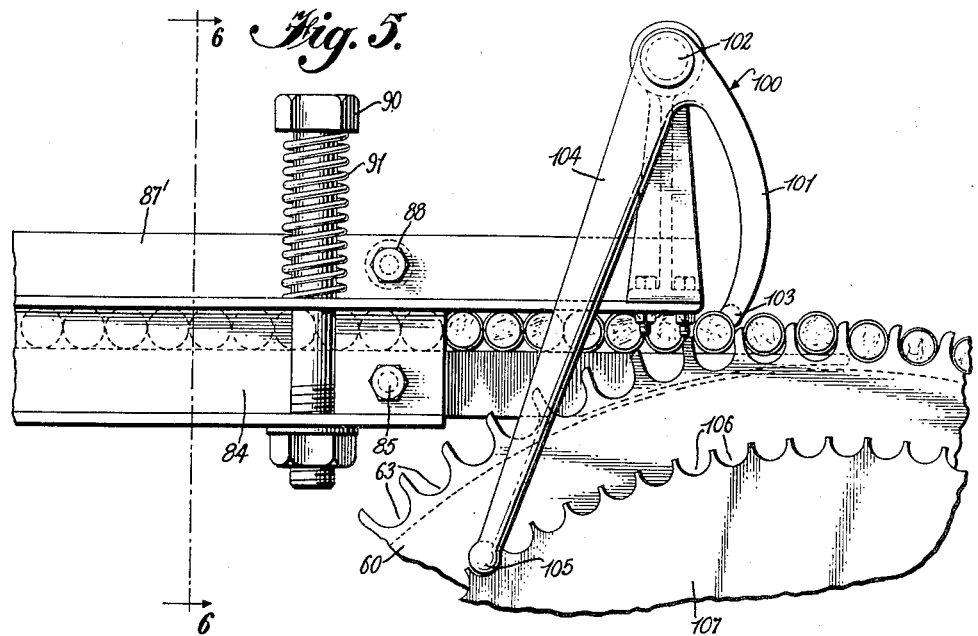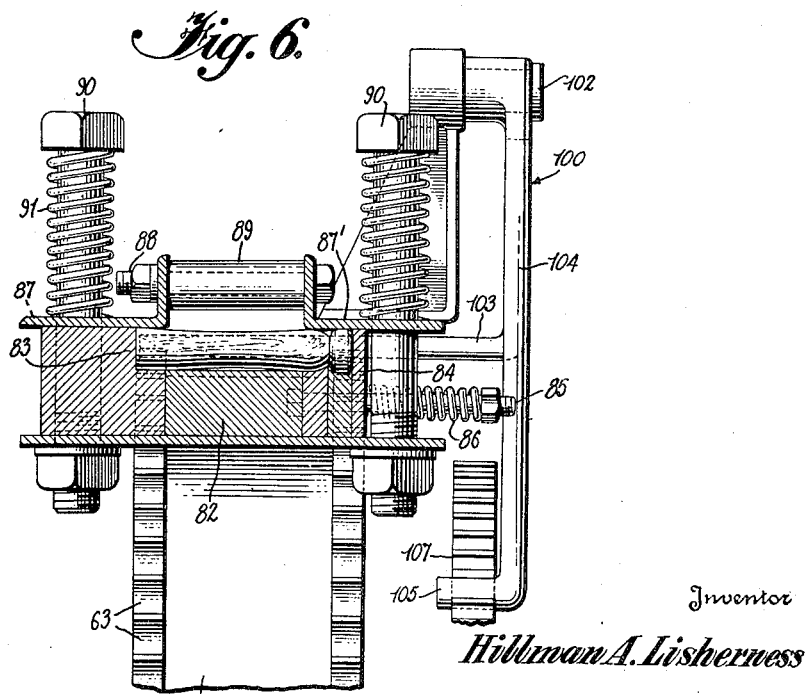

United States Patent Office 2,782,816
Patented Feb. 26, 1957

2,782,816

SLOTTING APPARATUS FOR CLOTHESPIN MACHINES

Hillman A. Lisherness, North Anson, Maine, assignor, by mesne assignments, to Forster Mfg. Co., Inc., a corporation of Maine Original application January 14, 1949, Serial No. 70,986, now Patent No. 2,667,191, dated January 26, 1954. Divided and this application January 15, 1954, Serial No. 404,156

3 Claims. (Cl. 144—9)

This invention relates in general to an automatic machine for making wooden clothespins and the like and more particularly to machines for automatically shaping and slotting clothespins from wooden dowels, wherein the dowels are properly oriented and continuously advanced individually through a plurality of forming operations and delivered from the machine in a finished condition.

Heretofore, automatic clothespin turning and slotting machines have, in general, been designed to operate in an interrupted series of steps or stages, advancing dowels or similar stock pieces intermittently into operative relation with a shaping cutter, usually requiring auxiliary turning chucks or similar position-altering means to be brought into engagement with each dowel for rotating the dowel while it is positioned before the cutter so as to shape the dowels symmetrically about their centers. The dowels are then advanced into position adjacent a rotating slotting saw at which point the shaped dowels are individually clamped and the slotting saw moved into position to cut a slot in each of the dowels of an appropriate preselected depth. In the interest of minimizing the complexity of such clothespin forming machines by a reduction in the number of moving parts and auxiliary operating mechanisms associated with the various operations, of increasing the rate of production of finished pins, and thus effecting a consequent reduction in initial outlay, maintenance and operating costs, it is highly desirable to dispense with the step-by-step or intermittent method of feeding and shaping the dowel blanks and provide for continuous advancing of the dowel blanks through the various operational stages, and particularly to provide for shaping and slotting the dowel blanks while they are seated on continuous conveyors without requiring the use of additional chucks, clamps or other auxiliary means for interrupting the feeding of the blanks and positioning the blanks relative to the shaping and slotting means.

Accordingly, an object of the present invention is the provision of a novel machine for automatically turning finished symmetrical articles wherein blanks of which such articles are to be formed are continuously advanced through the machine.

Another object of the present invention is the provision of a novel machine for automatically turning and slotting symmetrical articles from wooden or plastic blanks, and the like, wherein the blanks from which such articles are formed are continuously advanced through the turning and slotting stages of the machine.

Another object of the present invention is the provision of a novel machine for automatically arranging, shaping and slotting blanks of a turnable material into clothespins wherein the blanks are continuously fed during the shaping and slotting operations and delivered from the machine in a finished condition.

Another object of the present invention is the provision of a novel machine for automatically making clothespins from blanks of a turnable material characterized by uniformity and certainty of operation, continuous feeding of the blanks through the various operations, greater output and reduction of the number of moving parts therein and accordingly of the costs of production, maintenance, repair and operation thereof.

Another object of the present invention is the provision of a novel feeding mechanism for an automatic machine for making symmetrically turned, slotted articles wherein blanks of a turnable material are advanced continuously from a supply source through various shaping and slotting stages required in the production of the finished turned article and the article delivered from the machine in a finished condition.

Another object of the present invention is the provision of novel means in a machine for automatically making clothespins wherein blanks in the form of cylindrical dowels of a turnable material such as wood, plastic, or the like, are advanced continuously in a progressive series from a supply hopper through shaping and slotting stages required in the production of a finished clothespin and the turned article is delivered from the machine in a finished condition.

Another object of the present invention is the provision of novel means in a machine for automatically making clothespins adapted to maintain dowel blanks from which such clothespins are to be formed continuously seated and accurately oriented on continuous conveyor means therefor when such dowel blanks are brought into operative relation with shaping and slotting means provided therein.

Other objects, advantages and capabilities of the present invention will become apparent from the following description, taken in conjunction with the accompanying drawings showing only a preferred embodiment of the invention.

In the drawings:

Figure 2 is a top plan view of the clothespin slotting and shaping machine;

Figure 3 is a vertical transverse section view of a portion of the clothespin shaping and slotting machine taken along the lines 3—3 of Figure 1, and particularly illustrating the rotary feed drum, shaping cutter, and dowel retaining means, and the drive mechanisms therefor;

Figure 4 is a vertical transverse section view taken along the lines 4—4 of Figure 1, and illustrating particularly the shaped-dowel advancing drum, the pick-out actuator cam and follower mechanism, and the slotting conveyor channel components of the clothespin machine;

Figure 5 is a detail side elevation of the pick-out arm mechanism and actuator cam for advancing the shaped dowel in laterally abutting relation through the slotting channel in the instant machine; and Figure 6 is a vertical transverse section taken on the line 6—6 of Figure 5, illustrating particularly the slotting channel in the instant machine.

Figure 1:
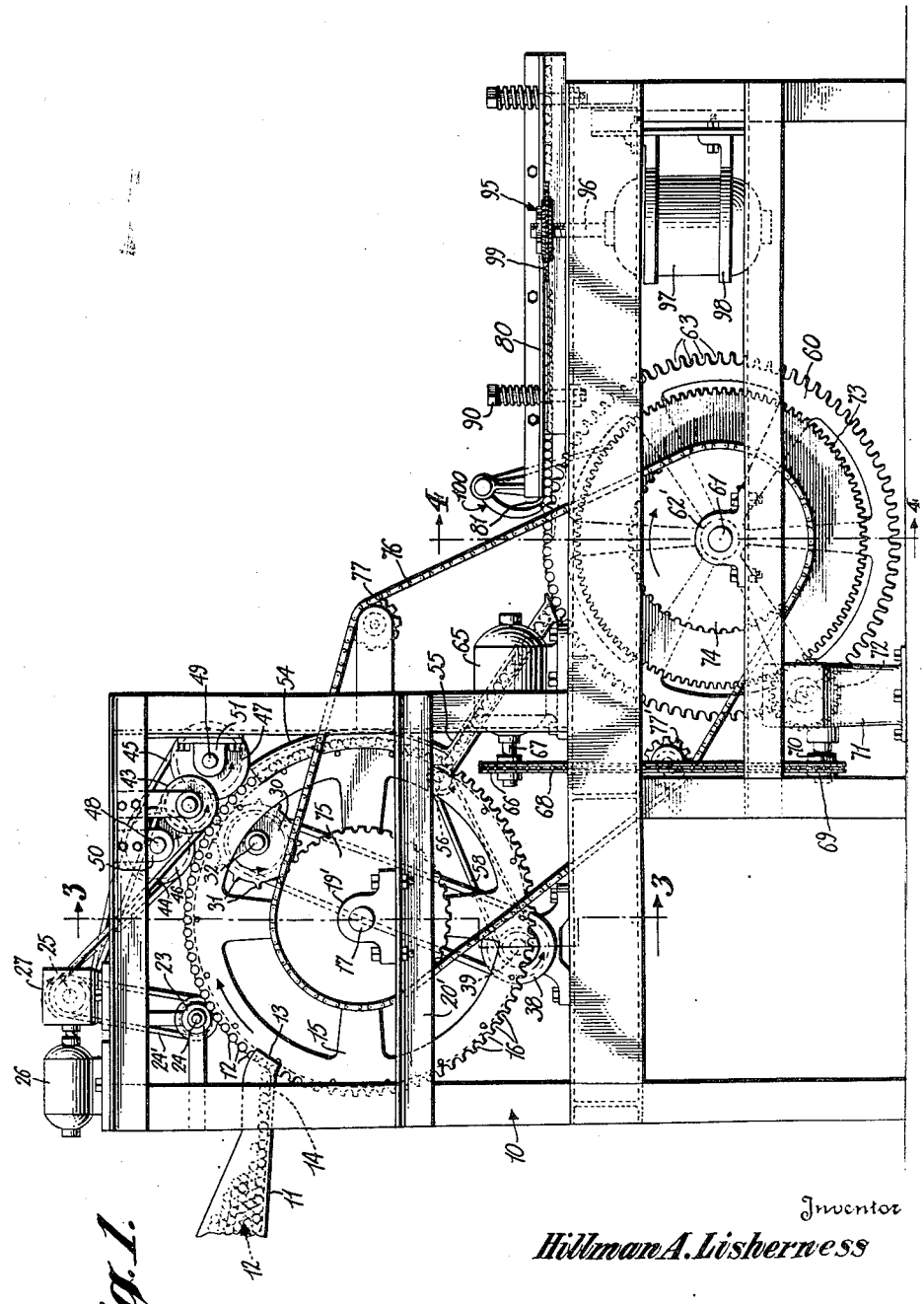
Figure 1 is a side elevation of a clothespin machine embodying the present invention, wherein portions of various inwardly positioned components of the machine are indicated in dotted lines for clarity of illustration.

The invention in general comprises a shaping cutter, a slotting cutter, and rotary carrier means for advancing blanks of the material of which the article is to be formed continuously through the shaping and slotting stages and delivering the article from the machine in the finished form. To accomplish this, a rotary feed drum having a plurality of peripheral seats formed thereon to receive and seat the blanks or stock pieces in an aligned, transversely oriented single series, is associated with each of the cutters, each being continuously driven to insure the uninterrupted advance of the stock pieces through the shaping and slotting stages.

The first feed drum is adapted to receive the stock pieces from a supply hopper or similar device and arrange the pieces in transversely oriented seated relation thereon in successive peripheral order. The stock pieces, usually in the form of a cylindrical dowel, are continuously advanced about an arcuate path defined by the periphery of the rotary feed drum into a position to be successively engaged by a driven shaper member having a rotary cutter head formed of a plurality of radial blades shaped to correspond to a portion of the outline projection of the finished article. The driven shaper member is fixedly positioned inwardly of the periphery of the feed drum to engage and cut away the inwardly disposed incident surfaces of the stock pieces as the stock pieces are advanced into a position adjacent the cutter head. The seats of the feed drum for this purpose have lateral slots formed at the base thereof and extend substantially the length of the stock pieces, through which the blades of the cutter head can enter the seats and shape the incident surfaces of the stock pieces.

To insure symmetrical shaping of the surfaces of the pieces about their longitudinal center axes, the finished articles being substantially of toroidal outline, a continuously driven wheel member is positioned outwardly of the periphery of the feed drum adjacent the cutter head with its peripheral surface disposed to bear on the surfaces of the stock pieces facing away from the cutter head when the stock piece is positioned to be engaged by the cutter head, to impart rotation to the stock pieces within its seat in the feed drum. In this manner, the surfaces of the stock pieces are accurately symmetrically shaped about their centers over their entire lateral surfaces in accordance with the desired finished surface pattern.

To prevent the stock pieces seated adjacent the piece being cut by the cutter head from being dislodged from their seats by reason of engagement with projections on the cutter blades, endless belt means mounted on driven pulley members and positioned to resiliently bear upon a plurality of such stock pieces and lying in an arcuate path corresponding to and extending along a portion of the periphery of the first feed drum is provided, the belt means being operative to retain the several stock pieces positioned near the cutter head in seated condition when engaged by the cutter head.

An additional feed drum is intercoupled with the first feed drum through a transfer chute extending therebetween, adapted to receive the shaped stock pieces from the first feed drum and feed them in properly oriented and aligned fashion into a horizontal channel operative to convey the stock pieces without rotation past a continuously driven slotting saw positioned to extend laterally into the channel and cut slots of a preselected depth in the stock pieces. Friction means are provided in the channel abutting a side and end of the stock pieces to prevent relative rotation of the pieces in the channel, and actuator means are disposed at the feed end of the channel to periodically engage the pieces and urge them through the channel in laterally abutting relation.

In this manner, a finished turned and slotted article of toroidal outline is automatically produced and delivered in finished condition, wherein the stock pieces of which the article is formed are continuously fed through the various operational stages of the machine and wherein great accuracy in defining the diameter and surface contours of the finished articles, greater uniformity of length of the articles, and reduced losses at the slotting stage due to tear-outs, as the pins are retained in closely laterally abutting relation at this stage, are all effectively realized by the particular arrangement and inter-relation of the components in the instant device.

The present invention will be more fully understood from the following detailed description of the embodiment illustrated in the accompanying drawings, in which like reference characters designate corresponding parts throughout the several figures. Referring particularly to Figures 1 to 3, inclusive, of the accompanying drawings, the various components of the clothespin machine are all mounted on a main supporting frame, generally indicated at 10, consisting of a network of vertical and horizontal frame members preferably constructed of steel I-beams or like commercially available structural members. Disposed to the left of the frame member 10, as viewed in Figure 1, is a supply hopper or feed trough 11 adapted to house a large supply of cylindrical dowel members, generally indicated at 12, of wood, plastic, or like turnable materials, in a generally vertically arranged group of a width equal to the length of the dowel members 12, the supply hopper 11 being disposed at such an angle that the dowel members contained therein are maintained lying on transverse, mutually parallel axes and urged by gravity in single successive order toward an opening 13 disposed in a restricted chute 14 formed at the inwardly disposed end of the hopper 11. The opening 13 at the inner end of the feed hopper 11 is disposed in juxtaposed relation with the peripheral surface of a first feed drum, indicated at 15, constructed generally in the form of a cylindrical drum having a plurality of peripherally disposed seats 16 formed thereon by slots disposed in the side of the drum 15. The seats 16 on the periphery of the drum 15 are oriented transversely to lie in mutually parallel axes parallel to the central axis of the drum 15 and dispose the stock pieces 12 in parallel transversely oriented relation about the periphery of the drum. The seats 16 are adapted to successively receive the stock pieces 12, from the supply hopper 11 as the stock pieces are urged in the direction of the feed drum 15 by gravity.

The feed drum 15 is adapted to be rotated about a transverse horizontal axis and for this purpose it is provided with a shaft 17 keyed to a hub 18 (Fig. 3) at the center thereof and extending through a pair of space bearing members 19 and 19' disposed on bracket frames 20 and 20' extending across the frame 10, to rigidly support the feed drum 15 for rotary movement about the horizontal axis defined by the shaft 17. The feed drum 15 is accordingly adapted to advance the stock pieces 12 clockwise in a curvilinear path away from the opening 13 at the inwardly disposed end of the supply hopper 11. The side of the feed drum 15 in which the seats 16 are defined is provided with a plurality of laterally extending slots 21 at the base of the seats 16 corresponding to the seats 16 so that the inner surfaces of the stock pieces 12 disposed in the seats 16 will be exposed inwardly of the side of the feed drum 15. Transverse strips 22 are provided at spaced intervals along each of the slots 21 to support the stock pieces 12 disposed in the peripheral seats 16.

Spaced a short distance from the inwardly disposed opening 13 of the supply hopper 11 in the path of the peripheral seats 16 on the sides of the feed drum 15 is a driver kick-back wheel member 23 mounted on a horizontal shaft 24 journaled to appropriate mounting bracket members on the frame member 10, disposed to engage the radially outwardly disposed surfaces of the stock pieces 12 in the peripheral seats 16. The wheel 23 is provided to engage stock pieces disposed in the peripheral seats 16 where more than one stock piece 12 may have become seated in a single peripheral seat 16 and direct the additional stock pieces rearwardly along the periphery of the feed drum 15, to insure the arrangement of the stock pieces 12 in single peripheral order about the feed drum 15.

This is effected by a continuously driving kick-back wheel member 23 in a clockwise direction relative to the shaft 24 so that the peripheral surface of the kick-back wheel will be operative to cam such additional stock pieces 12 rearwardly in the direction of the supply hopper 11, the wheel member 23 being driven through belt drive 24' from an auxiliary drive shaft 25 and electric motor 26 intercoupled through a gear reduction box 27, all mounted atop the main supporting frame 10.

Disposed inwardly of the periphery of the feed drum 15 and angularly displaced in the direction of rotation from the wheel 23 is a shaper member comprising a rotary cutterhead 30 having a plurality of radially extending cutter blades 31 disposed about the periphery thereof and mounted for rotation about a horizontal axis defined by a shaft 32 coupled thereto and extending through bearing members 33 and 33' suspended by supporting straps 34 and 34' from the main frame 10. The cutter blades 31 are formed in the manner of templates defining along their outer edges a portion of the outline projection of the finished shaped article, the outer cutting edges of the blades 31 being adapted to engage the inwardly disposed incident surfaces of the stock pieces 12 disposed in the peripheral seats 16 of the feed drum 15 successively as the feed drum is advanced in a clockwise direction, the blades 31 extending through the slots 22 formed at the bases of the seats 16.

The cutter head 30 is adapted to be continuously driven in a rotary manner at a high rate of speed relative to that of the feed drum 15 by means of an electric motor 35 of conventional commercially available type mounted on the main supporting frame 10, and for this purpose is provided with a pulley member 36 disposed on the shaft 32 and intercoupled by means of a belt or similar drive coupling 37 with a driven pulley 38 disposed on the shaft 39 of the electric motor 35.

To insure symmetrical shaping of the stock piece 12 when it is being engaged by the blades 31 of the cutter head 30 throughout the entire lateral surface area of the stock piece 12, a stock piece rotating wheel 40 is positioned outwardly of the periphery of the feed drum 15 in the path of the stock pieces seated therein to engage the upwardly disposed surface of the stock piece being shaped by the cutter head 30 and rotate the stock piece about its center within the peripheral seat 16 to expose all portions of the lateral surface of the stock piece to the cutter blades 31 through the slots 22 in the bases of the peripheral seats 16. The wheel 40 is mounted on a horizontally disposed shaft 41 journalled in bearing brackets 42 suspended from the main frame 10, the shaft being provided with a pulley 43 coupled by means of a crossed drive belt 44 with a pulley on the auxiliary drive shaft 25 associated with the electric motor 26.

Resilient hold-down belt members 45 are likewise provided above the periphery of the feed drum 15 and adjacent the cutter head 30 to bear upon a plurality of the stock pieces 12 in the peripheral seats 16 of the feed drum 15 disposed adjacent the cutter head to prevent the stock pieces 12 from being dislodged from the peripheral seats on engagement with the cutter blades 31. These belt members 45 are disposed about a pair of dual pulley members 46 and 47 mounted on shafts 48 and 49 journaled in bearing brackets 50 and 51, respectively, mounted on the main frame member 10, the dual pulley members 46 and 47 being so positioned relative to the feed drum member 15 that the lower portion of the belt members 45 are disposed along curvilinear path corresponding to the peripheral surface of the feed drum to engage the upper surfaces of the stock pieces 12 over a substantial segment of the periphery of the feed drum. The relatively upwardly disposed dual pulley member 46 is provided with a driven pulley 52 mounted on the shaft 48 and is intercoupled by a belt drive 53 with the auxiliary drive shaft 25 associated with electric motor 26 to drive the belt members 45 in a counterclockwise direction along the periphery of the feed drum 15.

An arcuate shield member 54 disposed in the direction of rotation of the feed drum from the belt members 40 extends a substantial distance over the downward portion of the peripheral path of the feed drum 15 to retain the shaped stock pieces 12 seated within their seats 16 along the periphery of the feed drum 15 as the stock pieces are advanced downwardly from the cutter head 30. A transverse chute member 55 is provided at the lower end of the shield 54 adapted to receive the shaped stock pieces 12 and direct them in a downwardly inclined path from the peripheral seats 16 of the first feed drum 15 to a second feed drum member 60 disposed on a horizontal axis parallel to and laterally and downwardly disposed to the axis of the first feed drum member 15. To insure that the shaped stock pieces 12 are effectively dislodged from their seats 16 in the feed drum 15 and directed into the transfer chute 55, an eccentric push-out cam 56 is mounted on a shaft 57 inwardly of the periphery of the feed drum 15 to periodically engage the inwardly disposed surfaces of the seated stock pieces 12 and urge them outwardly of the seats 16, the shaft 57 being continuously driven through belt and pulley coupling 58 from the electric motor 35.

The second feed drum 60 is mounted on a horizontal shaft 61 journaled and bearing brackets 62 and 62' mounted on the main supporting member 10 for rotation in a clockwise direction about the shaft 61, and is provided with peripheral seats 63 along the side thereof corresponding to the peripheral seats 16 in the first feed drum 15 for receiving and advancing in successive peripheral order the shaped stock pieces 12 from the lower end of the transfer chute 55.

Both the feed drums 15 and 60 are adapted to be driven from an electric motor 65 of conventional design mounted on the main supporting frame 10, the electric motor 65 being coupled to the second feed drum 60 through a sprocket 66 mounted on the shaft 67 of the electric motor 65 coupled through a chain 68 to a sprocket 69 on the drive input shaft 70 of a reduction gearing box 71, the reduction gearing box having a gear 72 at the output thereof engaging a gear 73 keyed to the shaft 61 of the second feed drum 60, the ratio of the gears 72 and 73 and the speed reduction ratio in the gear box 71 being provided to drive the feed drums 15 and 60 at a slow rate of speed relative to the cutter head 30 and dowel rotating wheel 40 driven by the electric motors 35 and 26 respectively. Rotation is imparted in the first feed drum 15 from the second feed drum 60 by means of sprockets 74 and 75 fixedly mounted on the feed drum shafts 61 and 17 respectively, intercoupled by means of a sprocket chain 76, idle sprockets 77 and 77' being also provided, mounted by suitable supporting brackets to the main supporting frame 10, to maintain the opposed portions of the sprocket chain 76 separated and in substantially taut condition.

Referring particularly to Figures 5 and 6, the second feed drum 60 is adapted to feed the transversely oriented shaped stock pieces 12 into a slotting channel, generally indicated at 80 (Fig. 1), extending substantially in a horizontal plane with an entrance opening 81 disposed in juxtaposed relation to the periphery of the second feed drum 60 to receive the shaped stock pieces 12 in laterally abutting relation therein. The slotting channel 80 is of substantially rectangular vertical cross section and is formed of a base member 82 mounted on the main supporting frame 10, with one side wall 83 formed thereon to define one wall of the slotting channel 80 and a side member 84 resiliently positioned relative thereto by means of a bolt member 85 mounted in the base member 82 and extending through an opening in the side member 84, a coil spring 86 being provided on the bolt member 85 and engaging the outer surface of the side member 84 to resiliently urge the side member inwardly toward the base member 82. A pair of flanged channel plates 87, 87' are provided having their inner flanged edges extending over the slotting channel 80 defined in the base plate 82 to engage the upper surfaces of shaped stock pieces 12 disposed within the channel 80, the plates being secured together along their inwardly directed flanges by means of a bolt member 88 and retained in fixed spaced relation by means of a tubular spacer 89 surrounding the bolt member 88 extending between the adjacent flanges of the plates 87, 87'. This upper slotting channel cover plate formed by the members 87, 87' is mounted to the base plate member 82 by means of machine bolts 90 extending through corresponding apertures provided in the flanged channel members 87, 87', and the base plate member 82 and provided with coil springs 91 bearing upon the upper surfaces of the flanged channel members 87 and 87' and resiliently urging them downwardly to engage the upper surfaces of the shaped stock pieces 12 in the slotting channel 80. By means of the resilient pressure of the springs 86 and 91, the side plate 84 and the upper flanged channel plates 87, 87' are maintained in abutting relation with the adjacent surfaces of the shaped stock pieces 12 disposed within the slotting channel 80 to resist any tendency of the shaped stock pieces within the channel to rotate as they are urged along the channel 80, this being effected as the frictional pressure exerted on the adjacent faces of the shaped stock pieces by the resiliently positioned plates 84, 87 and 87' is maintained substantially equal to that of the fixed walls of the channel 80 and the surfaces of the shaped stock pieces 12 so that any torque imparted to the shaped stock pieces by one of the plates as they are urged along the slotted channel 80 is opposed by an equal and opposite frictional torque upon the opposite surface of the stock piece to counteract any tendency of the stock piece to rotate.

A circular slotting saw 95 (Figs. 1, 2 and 4), of conventional design, is fixedly mounted on the vertical shaft 96 of an electric motor 97 supported on mounting bracket 98 coupled to the main supporting frame 10 and the circular slotting saw blade 99 is positioned so that the periphery of the slotting saw blade 99 extends horizontally and laterally into the slotting channel 80. The slotting saw is mounted to rotate on a vertical axis and is continuously driven by electric motor 97 so that slots of the depth of insertion of the slotting saw blade 99 into the slotting channel 80 are cut into the shaped stock pieces 12 as they are advanced through the slotting channel 80.

To facilitate the transfer of the shaped stock pieces into the entrance of the slotting channel 80 from the peripheral seats 63 of the second feed drum 60, a pick-out actuator mechanism 100 (Fig. 5) is provided, comprising an arcuate arm 101 pivotally mounted on a pivot pin or shaft 102 journaled on a horizontal axis above the entrance 81 of the slotting channel 80, the arcuate arm 101 having a laterally extending projection or finger 103 normally extending into the path of the shaped stock pieces 12 seated along the periphery of the second feed drum 60 to extend between adjacent pairs of such seated stock pieces. An actuator arm 104 is integrally coupled to the arcuate arm 101 pivoted on the pin or shaft 102 and extends downwardly therefrom, the lower end of the actuator arm 104 being shaped as a cam follower, indicated at 105, to engage and ride along a peripheral cam surface 106 of an actuator cam 107 disposed on the shaft 61 of the second feed drum 60. The periphery of the cam wheel 107 is formed with a plurality of camming projections corresponding to the peripheral seats 63 of the feed drum 60 to displace the arcuate arm 104 in a clockwise direction, as viewed in Figure 5, sufficient to urge the shaped stock pieces from the peripheral seats 63 immediately adjacent to the entrance 81 to the slotting channel 80 from the peripheral seat 63 into the slotting channel. In this manner the shaped stock pieces 12 seated along the periphery of the second feed drum 60 are accurately transferred from the peripheral seats 63 by the feed drum into the slotting channel 80 and forced through the slotting channel 80 in contiguous relation.

The operation of the clothespin machine illustrated in the accompanying drawings and described above, is substantially as follows: Stock pieces of a turnable material such as wood, plastic, or the like, preferably shaped in the form of cylindrical dowel of a predetermined length, are disposed in the supply hopper 11 and arranged along the downwardly inclined lower surface thereof near the inner opening 13 in a transversely aligned single series or layer extending along the lower surface of the feed hopper 11. The first feed drum 15 is continuously driven by means of a sprocket and chain intercoupling, consisting of sprockets 75, 74 and chain 76, from the second feed drum 60, the second feed drum being in turn continuously driven from electric motor 65 through sprockets 66 and 69 and chain 68, gear reduction box 71, and intercouple gears 72 and 73, the gear 73 together with sprocket 74 and feed drum 60 being all keyed to the shaft 61.

As the feed drum 15 is continuously rotated in a clockwise direction about the shaft 17, the seats 16 in the periphery thereof are successively brought into alignment with the inwardly disposed opening 13 of the feed hopper 11 to receive the stock pieces therein and advance them in a clockwise curvilinear path toward the rotary cutter head 30. The continuously driven kick-back wheel 23 driven from the auxiliary drive shaft 25 is disposed in the path of the peripheral seats 16 and the feed drum 15 to impel stock pieces rearwardly of the direction of rotation of the feed drum 15 when more than one stock piece is disposed in any one of the peripheral seats 16, thereby insuring that the stock pieces are accurately arranged in single successive peripheral order about the feed drum 15. The stock pieces disposed in the peripheral seats are then successively brought into position adjacent the rotary cutter head 30 continuously driven from the motor 35 where the blades 31 on the cutter head 30 engage the inwardly disposed portions of the surface of the seated stock pieces 12 through the slots 21 to cut away that portion of the surface of the stock pieces and shape them to the desired outline projection.

The stock pieces 12 at this position are likewise engaged by a dowel rotating wheel 40 disposed above the periphery of the feed drum 15 and driven from the auxiliary drive shaft 25 to continuously rotate the stock pieces 12 about their centers within the peripheral seats 16 while the stock pieces are in position to be cut by the cutter head 30 to insure symmetrical shaping of the stock pieces 12 about their entire lateral surfaces.

Hold-down belt means 45 are likewise disposed above the periphery of the feed drum 15 and located adjacent the cutter head 30 extending over a substantial sector of the periphery of the feed drum 15 to bear upon and retain the stock pieces within their seats 16 when the stock pieces are disposed near the cutter head 30 to insure that the blades of the cutter head 30 do not dislodge the stock pieces from their seats 16.

After engagement with the cutter head 30, the stock pieces 12 are then advanced in a clockwise path along the periphery of the drum 15 downwardly beneath a shield member 54 shaped to conform to the periphery of the feed drum 15 and prevent the stock pieces 12 from falling out of their seats as they are advanced through the lower half of the circular path defined by the periphery of the feed drum 15. At the lower end of the shield 54, the inner surfaces of the stock pieces 12 are engaged by the continuously driven eccentric kick-out wheel 56, operated to impel the stock pieces 12 from their peripheral seats 16 and into the transverse chute 55, by which they are conveyed in a downwardly inclined direction into corresponding peripheral seats 63 of the second feed drum 60. The stock pieces 16 seated in the peripheral seats 63 in the second feed drum 60 are advanced a short distance along an arcuate path about the drum 60 to the entrance 81 of the horizontally extending slotting channel 80, at which point the stock pieces 12 are individually impelled into the entrance 81 of the slotting channel 80 by means of the pick-out arm mechanism 100. For this purpose, the pick-out mechanism 100 comprises an actuator arm 104 having a cam follower 105 on the end thereof engaging cam wheel 107 on the shaft 61 to periodically rotate the actuator arm 104 and insert a finger formation 103 on the end of an arcuate arm 101 between successive stock pieces 12 and impel them into the entrance 81 of the channel 80.

The stock pieces are thereby forced through the slotting channel 80 in transversely oriented laterally contiguous relation past the continuously driven circular saw blade 99 extending laterally into the slotting channel 80 for cutting a slot of a preselected depth into the ends of the stock pieces 12 as the stock pieces are advanced through the slotting channel 80.

It will be apparent from the above description that a novel machine for automatically shaping and slotting turned articles such as clothespins and the like has been provided, in which a relatively high rate of production is maintained by virtue of the fact that the stock pieces from which the finished turned article is to be produced are continuously advanced in an uninterrupted fashion throughout the several operations in the machine, in which uniformity and accuracy of form are rigidly maintained despite the fact that the stock pieces are being continuously advanced while the shaping operations are being performed, the accuracy of symmetrical shaping of the surfaces of the stock pieces being effected by means of driven rotary members engaging and rotating the surfaces of the stock pieces as the stock pieces are exposed to the cutting operations, and in which the danger of the occurrence of tear-outs during the slotting operation on the stock pieces is greatly reduced by disposing the stock pieces in transversely aligned laterally abutting relation so that no free rearward break-out surface is provided on the stock pieces as they are being cut by the circular saw 99.

To reduce free dust in the device produced by the rotary cutter head 30 and the circular slotting saw 99, pneumatic dust-collectors, such as that indicated at 110 in dotted lines in Figure 2 of the drawings, may be disposed adjacent the cutter head 30 and the saw 99, these being of conventional commercially available types and do not constitute a part of the invention herein disclosed.

The present application is a division of my copending application Serial No. 70,986, filed January 14, 1949, issued January 26, 1954, as Patent No. 2,667,191.

While I have particularly shown and described one particular embodiment of the invention, it is distinctly understood that the invention is not limited thereto but that various modifications may be made without departing from the spirit and the scope thereof, it is desired, therefore, that only such limitations shall be placed thereon as are imposed by the prior art and as set forth in the appended claims.

What is claimed is:

1. Slotting means for clothespin making machine comprising a guideway, means for advancing shaped stock pieces along the guideway in abutting transverse relation to the direction of advance, slotting means extending into the guideway for slotting the advancing stock pieces inwardly from one end, said guideway having a main wall shaped to conform to a portion of the head of the shaped stock piece and side walls spaced substantially the length of the pieces, the side wall at the head end of the stock piece being resiliently mounted to effect frictional engagement between the ends of the stock piece and the side walls of the guideway, and resiliently mounted means spaced from the main wall of the guideway and resiliently engaging the stock pieces adjacent the head and opposite end to effect frictional engagement of said end portions of the stock pieces with the main wall diametrically of the head and opposite end portions of the pieces.

2. Slotting means for clothespin making machine comprising a guideway, means for advancing individual stock pieces having shaped head and body portions along the guideway in abutting transverse relation to the direction of advance, slotting means extending into the guideway for slotting the body portions of the advancing pieces inwardly from the end opposite the head, said guideway comprising a main wall having a portion shaped to conform to the side of the shaped head and adjacent body portion of the stock pieces, resiliently mounted guiding means opposite the shaped portion of the main wall for maintaining the shaped head and adjacent body portion of the stock pieces in frictional engagement with the conformingly shaped main wall of the guideway during advance of the stock pieces, and resiliently mounted wall means engaging the head end of the pieces axially thereof.

3. Slotting means for clothespin making machine comprising a guideway, means for advancing individual stock pieces having shaped head and body portions along the guideway in abutting transverse relation to the direction of advance, slotting means extending into the guideway for slotting the body portions of the advancing pieces inwardly from the end opposite the head, said guideway comprising a main wall having a portion shaped to conform to the side of the shaped head and adjacent body portion of the stock pieces, a resiliently mounted guiding wall engaging the head end of the pieces axially thereof, guiding means spaced from the main wall of the guideway and engaging the stock pieces adjacent the head and opposite end of the stock pieces during advance along the guideway, and resilient means acting on the last mentioned guiding means to effect frictional dragging engagement of the stock pieces with the guideway, said resilient means being adjustable to vary the relative frictional drag imparted to the opposite end portions of the stock pieces.

References Cited in the file of this patent

UNITED STATES PATENTS

| Number | Name | Date |
| --- | --- | --- |
| 518,954 | Hubbard | May 1, 1894 |
| 767,447 | Smith | Aug. 16, 1904 |
| 767,448 | Smith | Aug. 16, 1904 |
| 918,708 | Smith | Apr. 20, 1909 |
| 1,061,644 | Turner et al. | May 13, 1913 |
| 1,109,948 | Turner et al. | Sept. 8, 1914 |
| 2,667,191 | Lisherness | Jan. 26, 1954 |

FOREIGN PATENTS

| Number | Country | Date |
| --- | --- | --- |
| 111,488 | Australia | Sept. 6, 1940 |